United States Patent
Kim (10) Patent No.: US 10,234,022 B2
(45) Date of Patent: Mar. 19, 2019

(54) ELECTRONIC TRANSMISSION SYSTEM

(71) Applicants: HYUNDAI MOTOR COMPANY, Seoul (KR); KIA MOTORS CORPORATION, Seoul (KR)

(72) Inventor: Eun Sik Kim, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/820,879

(22) Filed: Nov. 22, 2017

(65) Prior Publication Data

US 2019/0032772 A1   Jan. 31, 2019

(30) Foreign Application Priority Data

Jul. 27, 2017  (KR) .................. 10-2017-0095214

(51) Int. Cl.
*F16H 59/02* (2006.01)
*F16H 59/04* (2006.01)
*F16H 59/08* (2006.01)
*F16H 59/12* (2006.01)
*F16H 61/24* (2006.01)

(52) U.S. Cl.
CPC ........... *F16H 59/044* (2013.01); *F16H 59/12* (2013.01); *F16H 61/24* (2013.01); *F16H 2059/026* (2013.01); *F16H 2059/081* (2013.01); *F16H 2061/243* (2013.01)

(58) Field of Classification Search
CPC ........ B60K 20/00; B60K 20/02; B60K 20/04; B60K 2023/085; B60K 2023/0858; B60K 2023/0883; F16H 59/02; F16H 59/12; F16H 59/0204; F16H 2059/0221; F16H 59/044; F16H 59/042; F16H 59/0278; F16H 2059/081; F16H 2059/082
USPC .......................................... 74/473.18, 473.3
See application file for complete search history.

(56) References Cited

U.S. PATENT DOCUMENTS

| | | | |
|---|---|---|---|
| 6,427,553 B1* | 8/2002 | Hogberg | F16H 59/0204 200/5 R |
| 8,955,405 B2* | 2/2015 | Heo | F16H 59/04 74/473.18 |
| 9,309,963 B2* | 4/2016 | Cha | F16H 59/12 |
| 9,458,925 B1* | 10/2016 | Ding | F16H 59/105 |

(Continued)

FOREIGN PATENT DOCUMENTS

KR   20-0373194 Y1   1/2005

Primary Examiner — Ha Dinh Ho
Assistant Examiner — Bobby Rushing, Jr.
(74) Attorney, Agent, or Firm — Morgan Lewis & Bockius LLP (57) ABSTRACT

An electronic transmission system includes: a panel operation device that is rotatably installed by being coupled to a rotary shaft in a console panel, the panel operation device having a plurality of operation buttons on an end face, each of which transmits a gearshift signal; and a rotary operation device disposed on the panel operation device, exposed from a circumferential face of the panel operation device, and rotating in a circumferential direction of the panel operation device so that the rotary operation device transmits the gearshift signal while being rotationally operated. The gearshift signal is transmitted through the plurality of operation buttons of the panel operation device according to a position to which the panel operation device rotates in the console panel.

18 Claims, 7 Drawing Sheets

(56) References Cited

U.S. PATENT DOCUMENTS

2008/0264194 A1* 10/2008 Bowman ............. F16H 59/0204
74/473.18
2017/0184194 A1* 6/2017 Ding ...................... B60K 35/00

* cited by examiner

ELECTRONIC TRANSMISSION SYSTEM

CROSS-REFERENCE(S) TO RELATED APPLICATIONS

The present application claims the benefit of priority to Korean Patent Application No. 10-2017-0095214 filed on Jul. 27, 2017, the entire content of which is incorporated herein for all purposes by this reference.

TECHNICAL FIELD

The present disclosure relates to an electronic transmission system that enables a driver to selectively use a button-type gearshift mode and a dial-type gearshift mode in order to provide various operational feelings.

BACKGROUND

In the conventional automatic transmission vehicle, P, R, N, and D gearshift stages are typically linearly arranged, and one of the gearshift stages may be selected by rotating a gearshift lever, and during the rotation of the gearshift lever, a cable is pulled so that operation force is transmitted to the transmission.

That is, since the point at which the cable is connected to the gearshift lever is upwardly spaced apart from the rotation center of the gearshift lever, the cable is pulled or loosened depending on the rotation angle and as a result when the gearshift lever is rotated. Therefore, the operation force is transmitted to the transmission and is thus recognized, so that the shifting of the gearshift stages is performed.

Meanwhile, in the case of a conventional gearshift lever for an automatic transmission vehicle, since the gearshift lever protrudes from a console, the operational feeling is similar to that of a conventional mechanical gearshift lever operating method. Further, as the space occupied by the gearshift lever becomes larger, it is difficult to secure an accommodation space. In addition, as the gearshift lever protrudes above the console, there is also a problem that, in the event of a vehicle accident, the driver's head may be hit by the gearshift lever, resulting in serious injury.

Accordingly, in recent years, an electronic gearshift lever has been applied, and with the introduction of the electronic gearshift lever, a button-type gearshift has been developed. However, even though the button-type gearshift has been developed, there is a problem in that since the operation is limited that of simply pressing the buttons, a gearshift feeling is limited.

The information disclosed in the present Background of the Invention section is only for enhancement of understanding of the general background of the invention, and should not be taken as acknowledgment or any form of suggestion that that the present information forms the prior art already known to a person skilled in the art.

SUMMARY

The present disclosure is proposed in order to solve the problems described above, and provides an electronic transmission system that enables a button-type gearshift and a dial-type gearshift to be selectively used in order to provide various operational feelings to the driver.

In order to achieve the above-mentioned object, an electronic transmission system according to the present disclosure includes: a panel operation device rotatably coupled to a rotary shaft in a console panel, and having a plurality of operation buttons on an end face, each of which transmits a gearshift signal; and a rotary operation device disposed on a panel operation device, exposed from a circumferential face of the panel operation device, and rotating in a circumferential direction of the panel operation device so that the rotary operation device transmits a gearshift signal while being rotationally operated. The gearshift signal is transmitted through the plurality of operation buttons of the panel operation device according to a position to which the panel operation device rotates in the console panel.

The console panel has a depression recess formed therein such that the panel operation device is seated in the depression recess, and the rotary shaft extends in a horizontal direction such that the panel operation device is rotatably installed in the depression recess.

The panel operation device includes: an operation cover that is formed in a shape of a panel having an end face and includes the plurality of operation buttons on the end face; and a support cover that is formed in a same panel shape as the operation cover, is provided with a fixing pin extending in a vertical direction of the end face, and is spaced apart from the operation cover by being coupled with the operation cover through the fixing pin.

The rotary operation device is interposed between the operation cover and the support cover, and the fixing pin penetrates the rotary operation device so that the rotary operation device is installed to be rotatable around the fixing pin.

All the operating cover, the support cover, and the rotary operation device are formed in a circular shape and have the same center of circle, and the fixing pin of the support cover is positioned at the center of the circle.

The rotary operation device is formed to have a width that is larger than a width of the operation cover and the support cover, so that the rotary operation device is exposed in a circumferential direction between the operation cover and the support cover.

The operation cover or the support cover has a detent recess which is depressed on the end face thereof that faces the rotary operation device in a width smaller than an entire width, and a plurality of protrusions, which is formed on a circumferential face of the detent recess to repeatedly protrude toward a center of the detent recess. The rotary operation device is provided with a detent mechanism that is positioned to correspond to the circumferential face of the detent recess and to be elastically moved toward the circumferential face of the detent recess.

The rotary operation device includes a mounting hole that is provided at a position corresponding to the circumferential face of the detent recess. The detent mechanism includes an elastic body fixed to the mounting hole so as to apply a tensile elastic force, and a detent pin coupled to the elastic body and formed to extend in a same direction as the direction in which the fixing pin penetrates so as to come into contact with the circumferential face of the detent recess.

On the circumferential face of the support cover, a connection end portion is formed to extend so as to be connected to the rotary shaft.

The rotary operation device is provided with a position detection magnet, and the panel operation device is provided with a position sensor that senses a change in position of the position detection magnet during the rotation of the rotary operation device.

The console panel is provided with a drive motor that is connected to the rotary shaft and is operated under control of the controller so as to cause the rotary shaft to be rotated, and the drive motor causes the rotary shaft to be forwardly and reversely rotated by 90° during the operation thereof.

When the end face of the panel operation device is disposed to face upward of the console panel, the controller causes gearshift control to be performed with a gearshift signal according to the operation of the plurality of operation buttons, and causes a gearshift signal according to the rotation of the rotary operation device to be shut off.

When the panel operation device is rotated so that the rotary operation device is disposed to face upward of the console panel, the controller causes gearshift control to be performed with a gearshift signal according to the rotation of the rotary operation device, and causes a gearshift signal according to the operation of the plurality of operation buttons to be shut off.

The panel operation device is provided with a manual gearshift mode button, and the controller controls the drive motor when a command is input according to the operation of the manual gearshift mode button so that the rotary operation device faces upward, and as a result, the gearshift control is performed to a positive (+) stage or negative (−) stage by the operation of the rotary operation device.

The console panel is provided with a mode switching button, and the controller controls the drive motor when a command is input according to operation of the mode switching button so that the panel operation device is rotated, and wherein when the end face of the panel operation device is disposed to face upward, the controller causes the gearshift control to be performed by the operation of the plurality of operation buttons, and when the rotary operation device is disposed to face upward, the gearshift control is performed by rotational operation of the rotary operation device.

When the mode switching button is operated in a state where a vehicle is stopped, the controller causes control according to a corresponding command to be performed.

The electronic transmission system having the above-described structure enables a button-type gearshift mode and a dial-type gearshift mode to be selectively used, so that various operational feelings may be provided to the driver. Therefore, since a gearshift operation can be performed in a mode desired by the driver, convenience can be improved.

The methods and apparatuses of the present disclosure have other, features and advantages which will be apparent from or are set forth in more detail in the accompanying drawings, which are incorporated herein, and the following Detailed Description, which together serve to explain certain principles of the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
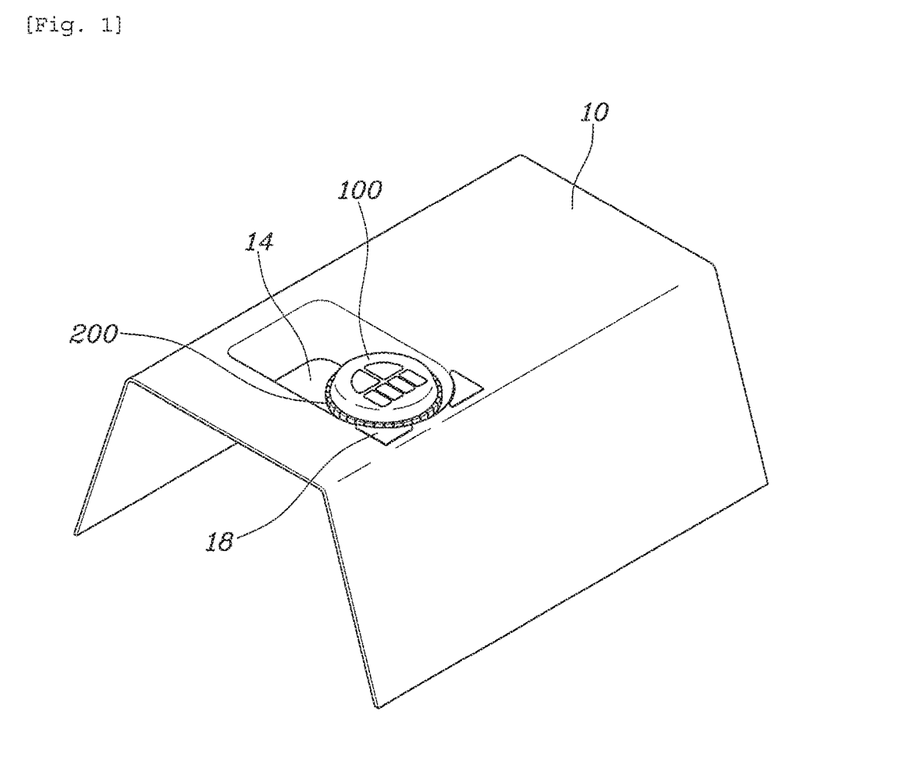
FIG. 1 is a view illustrating an electronic transmission system according to one exemplary embodiment of the present disclosure.
Figure 7:
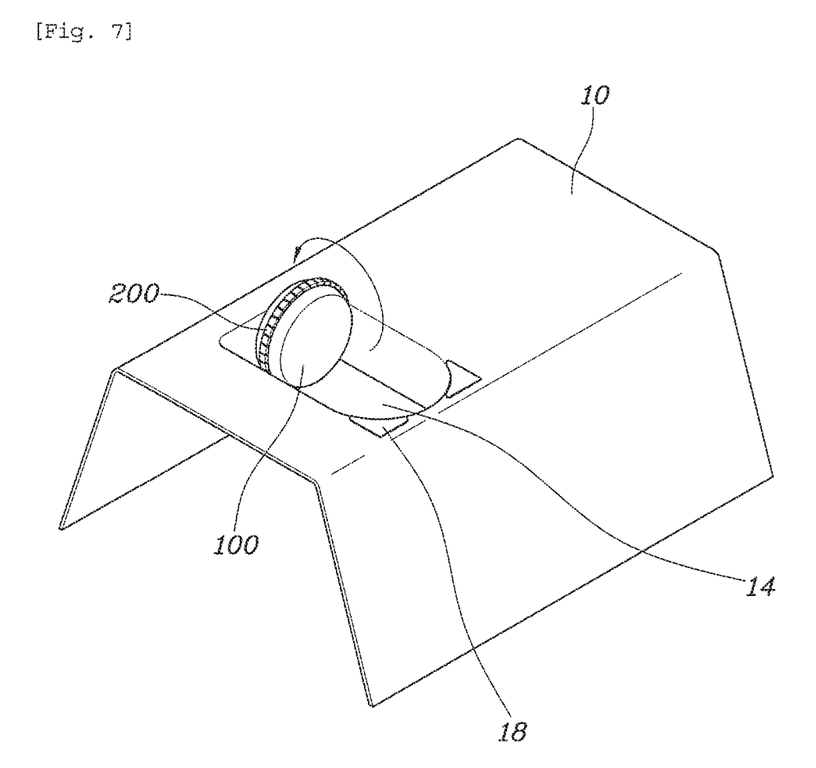
FIG. 7 is a view for explaining an operating state of the electronic transmission system illustrated in FIG. 1.

FIG. 1 is a view illustrating an electronic transmission system according to one exemplary embodiment of the present disclosure, FIG. 2, FIG. 3, FIG. 4, FIG. 5 and FIG. 6 are views for explaining the electronic transmission system illustrated in FIG. 1, and FIG. 7 is a view for explaining an operating state of the electronic transmission system illustrated in FIG. 1.

Figure 2:
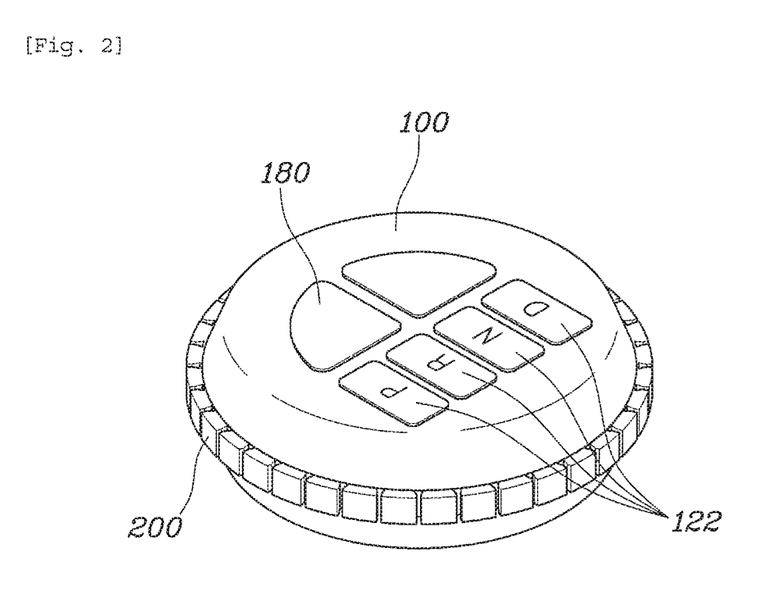
FIGS. 2-6 are views for explaining the electronic transmission system illustrated in FIG. 1.

As illustrated in FIG. 1 and FIG. 2, the electronic transmission system according to the present disclosure includes: a panel operation device 100 coupled to a rotary shaft 12 in a console panel 10 to be rotatable and including, on an end face, a plurality of operation buttons 122 configured to transmit transmission signals; and a rotary operation device 200 provided in a panel operation device 100 and formed to be exposed from a peripheral surface of the panel operation device 100 and installed to be rotatable in the circumferential direction of the panel operation device 100 so that the rotary operation device transmits a gearshift signal while being rotationally operated. The gearshift signals are transmitted through the operation buttons 122 of the panel operation device 100 according to the position where the panel operation device 100 is rotated in the console panel 10, or the transmission signals are transmitted according to the rotation of the rotary operation device 200.

The present disclosure is to enable a button-type gearshift and a dial-type gearshift to be selectively used. The panel operation device 100 is provided with a plurality of operation buttons 122 and configured to enable the button-type gearshift mode to be implemented, and to enable a dial-type gearshift mode to be implemented through the rotary operation device 200 that is rotated along the circumference on the panel operation device 100.

That is, in the console panel 10, the panel control device 100 is rotatably installed on the rotary shaft 12, and the button-type gearshift is performed through the operation buttons 122 provided on the end face of the panel control device 100. Accordingly, when the end face of the panel operation device 100 is disposed to face upwardly of the console panel 10 so that the operation buttons 122 are exposed upward, a gearshift to a specific shift stage among the P, R, N, and D gearshift stages may be performed through the operation of the operation buttons 122.

The rotary operation device 200 is formed to be exposed along the circumferential face of the panel operation device 100, and is provided to be rotatable in the circumferential direction of the panel operation device 100. Accordingly, when the panel operation device 100 is rotated about the rotary shaft 12 and the rotary operation device 200 is disposed to be exposed upwardly of the console panel 10, a gearshift to a specific gearshift stage among the P, R, N, and D gearshift stages may be performed by rotationally operating the rotary operation device 200.

As described above, in the present disclosure, a gearshift may be performed through the operation buttons 122 or the rotary operation device 200 provided on the panel operation device 100, and by rotating the panel operation device 100 about the rotary shaft 12 in the console panel 10, the panel operation device 100 may be switched to a state suitable for operating the operation buttons 122 or to a state suitable for operating the rotary operation device 200. Due to this, it is possible to perform the control of a gearshift by selecting a button-type gearshift mode through the operation of the operation buttons 122 or the dial-type gearshift mode through the operation of the rotary operation device 200 according to the rotational position of the panel operation device 100.

Hereinafter, the present disclosure will be described in detail.

As can be seen from 1 and 7, the console panel 10 is formed with a depression recess 14 in which the panel operation device 100 is seated, and the rotary shaft 12 extends horizontally in the depression recess 14, so that the panel operation device 100 may be rotated in the depression recess 14.

In this way, the console panel 10 is formed with the depression recess 14 in which the rotary shaft 12 extends, and the panel operation device 100 is seated in the depression recess 14, so that the appearance design is not impeded by the panel operation device 100 protruding from the console panel 10. That is, as illustrated in FIG. 1, when the end face of the panel operation device 100 faces upwardly of the console panel 10, the operation buttons 122 may be exposed upward and the rotary operation device 200 may be made not to be opened from the depression recess 14, As illustrated in FIG. 7, when the panel operation device 100 is rotated so that the rotary operation device 200 is exposed upwardly of the console panel 10, the rotary operation device 200 is exposed upwardly and the operation buttons 122 may be made to be difficult to operate.

As described above, the button-type gearshift mode and the dial-type gearshift mode is distinguished from each other according to the position where the panel operation device 100 is rotated in the depression recess 14, so that error can be reduced during the gearshift operation.

Figure 3:
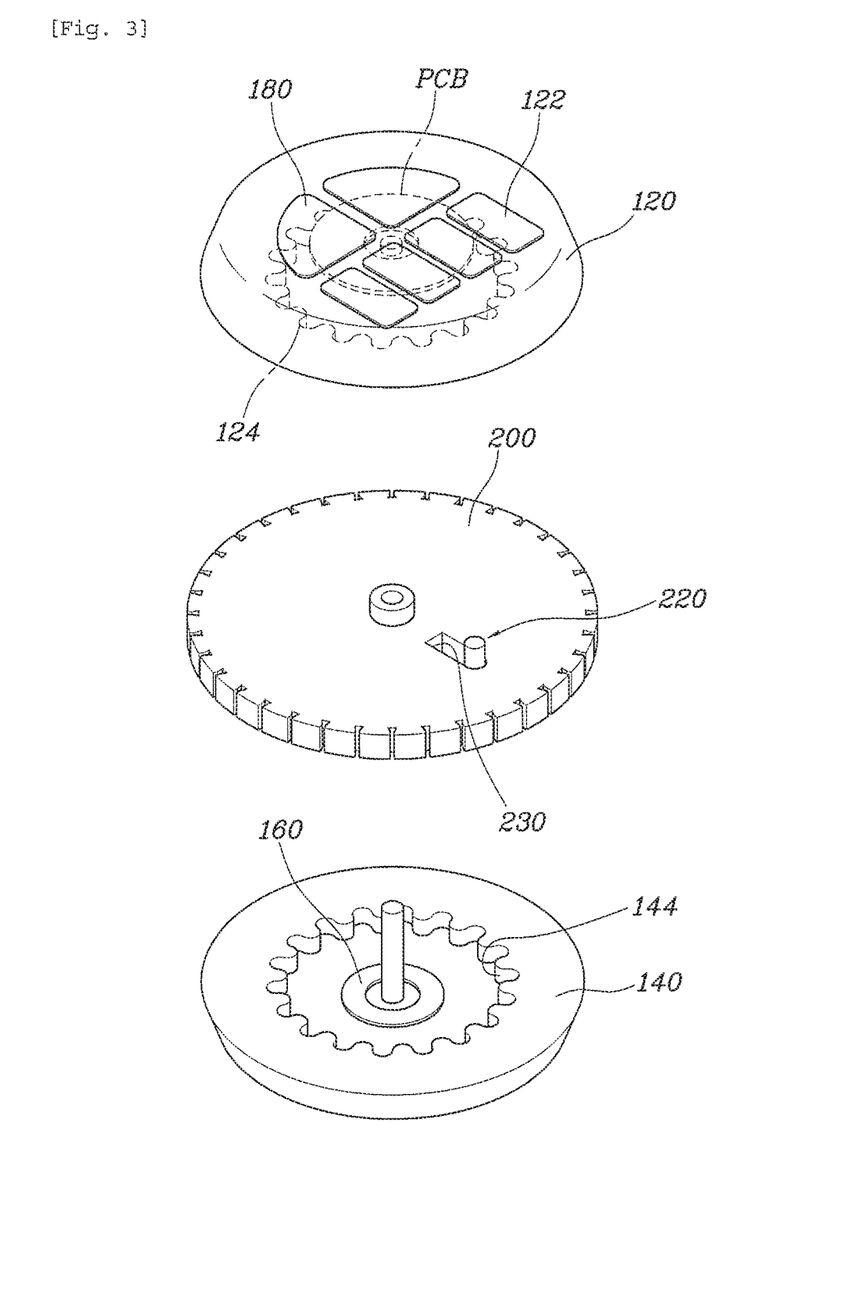

As illustrated in FIG. 3, the panel operation device 100 includes: an operation cover 120 having a panel shape having an end face and having a plurality of operation buttons 122 on the end face thereof; and a support cover 140 formed in the same panel form as the operation cover 120, provided with a fixing pin 142 extending in the vertical direction of the end face, and coupled with the operation cover 120 through the fixing pin 142, thereby being to be spaced apart from the operation cover 120.

Here, since the plurality of operation buttons 122 is provided on the operation cover 120, a PCB may be provided in order to transmit/receive a command according to the operation of the operation buttons 122.

In addition, the operation cover 120 and the support cover 140 are formed in the form of a panel having a planar end face, and the peripheries thereof may be formed to have a gentle slope according to a design element.

The operation cover 120 and the support cover 140 may be coupled to each other through the fixing pin 142 formed on the support cover 140. That is, since the fixing pin 142 extends in the vertical direction from the end face of the support cover 140, and the operation cover 120 is fitted and coupled to the fixing pin 142, the support cover 140 and the operation cover 120 are disposed to be spaced apart from each other by the extension length of the fixing pin 142. Here, the fixing pin 142 may be integrated with the support cover 140, and the fixing pin 142 may be screwed to the operation cover 120, or the coupling state may be fixed through a separate projection structure.

Specifically, the rotary operation device 200 may be interposed between the operation cover 120 and the support cover 140, and may be installed to be rotatable about the fixing pin 142 as the fixing pin 142 passes through the rotary operation device 200. That is, since a space is provided between the operation cover 120 and the support cover 140 when the operation cover 120 and the support cover 140 are coupled through the fixing pin 142, the rotary operation device 200 may be interposed between the operation cover 120 and the support cover 140. Particularly, in the case of the rotary operation device 200, since the fixing pin 142 penetrates the rotary operation device 200, the rotary operation device 200 is installed to be rotatable about the fixing pin 142, so that a dial-type gearshift mode can be implemented.

In addition, all the operation cover 120, the support cover 140, and the rotary operation device 200 may be formed in a circular shape and may have the same center of the circle, and the fixing pin 142 of the support cover 140 may be located at the center of the circle.

As illustrated in FIG. 2 and FIG. 3, since all the operation cover 120, the support cover 140, and the rotary operation device 200 are formed in a circular shape, when the driver operates the rotary operation device 200, it is possible to prevent the rotary operation device 200 from interfering with the operation cover 120 or the support cover 140, and as a result, it is possible to prevent the driver from feeling uncomfortable. In addition, since the operation cover 120, the support cover 140, and the rotary operation device 200 have the same center of circle, they are stable in design, and when the rotary operation device 200 rotates, the interference of the operation cover 120 and the cover 140 may be minimized.

In particular, as illustrated in FIG. 2, since the width of the rotary operation device 200 is larger than the widths of the operation cover 120 and the support cover 140, the rotary operation device 200 may be exposed between the operation cover 120 and the support cover 140 in the circumferential direction.

Accordingly, even if the rotary operation device 200 is interposed between the operation cover 120 and the support cover 140, the rotary operation device 200 is exposed in the circumferential direction of the operation cover 120 and the support cover 140, which enables the driver to touch and operate the rotary operation device 200. A plurality of recesses may be formed around the rotary operation device 200 in order to facilitate operation of the rotary operation device 200 by friction.

As illustrated in FIGS. 3 to 6, the operation cover 120 or the support cover 140 may be formed with a detent recess 124 or 144 on an end face that faces the rotary operation device 200, in which the detent recess 124 or 144 is recessed in a width smaller than the entire width of the end face and has a plurality of protrusions that repeatedly protrude toward the center along the circumferential face thereof.

In addition, the rotary operation device 200 may be provided with a detent mechanism 220 that is positioned to correspond to the circumferential face of the detent recesses 124 and 144, and is elastically moved toward the circumferential faces of the detent recesses 124 and 144.

Here, the detent recess 124 or 144 may be formed on one of the operation cover 120 and the support cover 140, but the detent recesses 124 and 144 are preferably formed on both of the operation cover 120 and the support cover 140.

That is, since the operation cover 120 and the support cover 140 may be formed with detent recesses 124 and 144 on the end faces thereof facing the rotary operation device 200, and the rotary operation device 200 is provided with a detent mechanism 220 that is installed to be elastically moved toward the detent recesses 124 and 144, a distinct feeling may be provided as the detent mechanism 220 moves over the plurality of protrusions of the detent recesses 124 and 144 during the rotation of the rotary operation device 200. Accordingly, the driver may recognize that the gearshift operation is performed by the distinct feeling during the rotation of the rotary operation device 200.

Specifically, the rotary operation device 200 may include a mounting hole 230 formed at a position corresponding to the circumferential face of the detent recess 124 or 144, and the detent mechanism 220 may include: an elastic body 222 fixed to the mounting hole 230 so as to apply a tensile elastic force; and a detent pin 224 that is coupled to the elastic body 222, is formed to extend in the same direction as the penetration direction of the fixing pin 142, and comes into contact with the circumferential faces of the detent recesses 124 and 144.

Here, the mounting hole 230 formed in the rotary operation device 200 is formed at a position corresponding to the detent recesses 124 and 144 in the state where the operation cover 120 and the support cover 140 are coupled to each other via the fixing pin 142, the elastic body 222 and the detent pin 224 are provided in the mounting hole 230, the detent pin 224 receive the tensile elastic force transmitted from the elastic body 222, so that the detent pin 224 can be held in contact with the detent recesses 124 and 144 formed in the operation cover 120 and the support cover 140. Here, the detent pin 224 extends in a direction parallel to the penetration direction of the fixing pin 142 and extends to the detent recesses 124 and 144 formed in the operation cover 120 and the support cover 140, so that the detent pin 224 can be held in contact with the plurality of protrusions formed in the detent recesses 124 and 144. In addition, the elastic body 222 connected to the detent pin 224 is configured with a spring, and delivers an elastic force to the detent pin 224 such that the detent pin 224 is moved in the widthwise direction of the rotary operation device 200. Accordingly, the detent pin 224 can be held in contact with the detent recesses 124 and 144.

In this way, the rotary operation device 200 rotates about the same center point between the operation cover 120 and the support cover 140. In particular, the detent recesses 124 and 144 are formed in the operation cover 120 and the support cover 140, and the detent pin 224 of the detent mechanism 220 provided in the rotary operation device 200 is configured to be held in contact with the detent recesses 124 and 144, so that a distinct feeling may be provided during the rotation of the rotary operation device 200.

Figure 4:
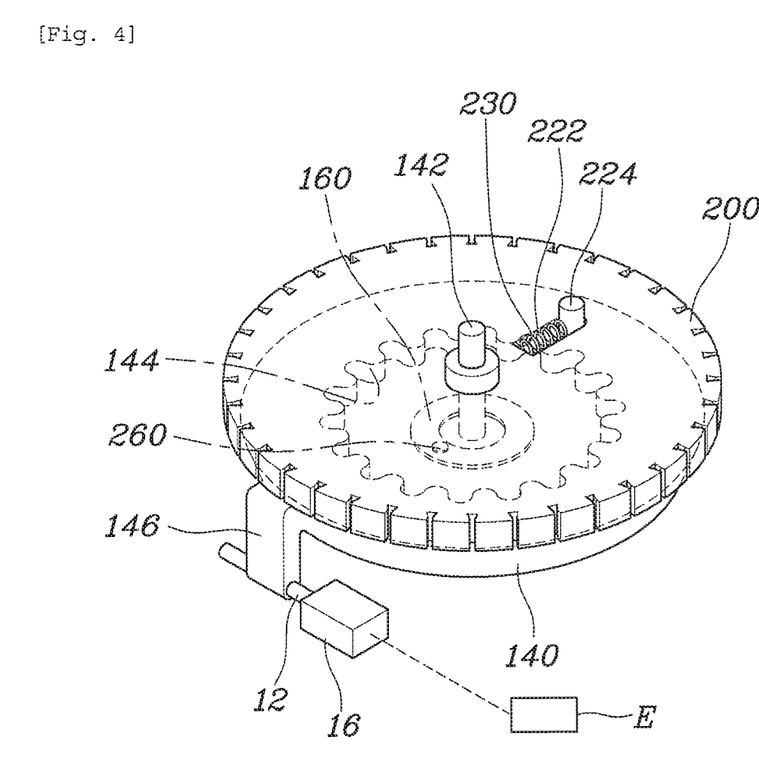
Figure 5:
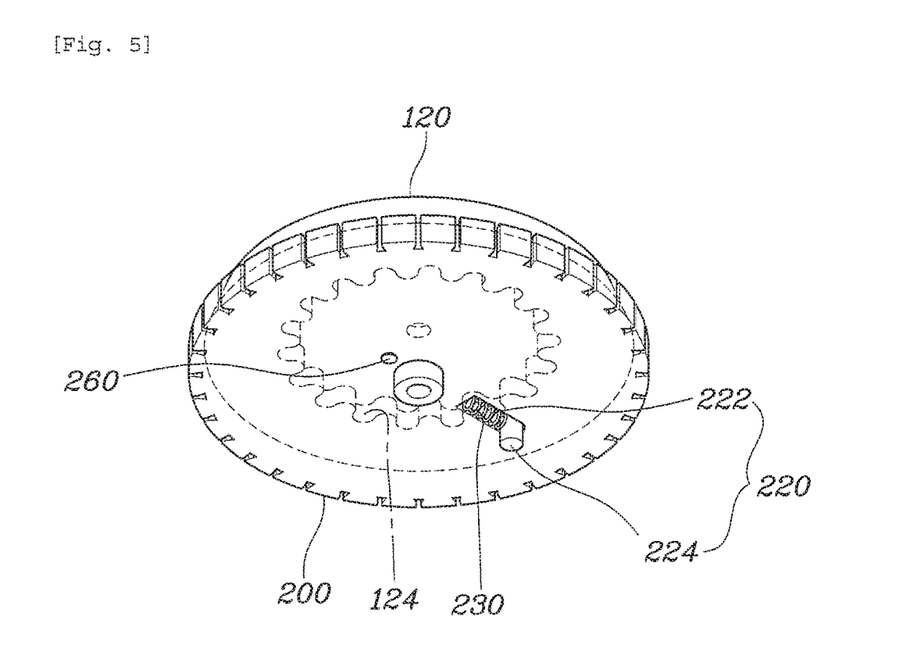
Figure 6:
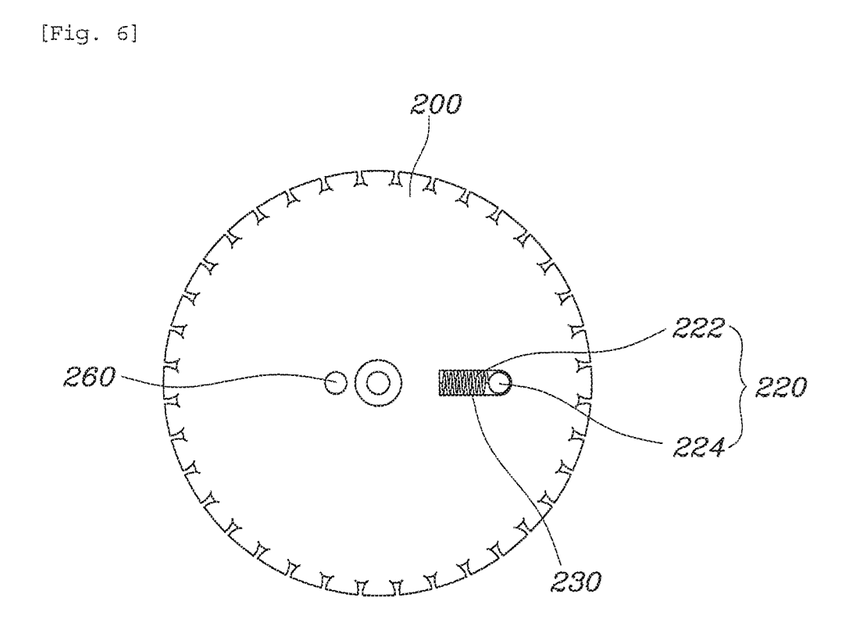

Meanwhile, as illustrated in FIG. 4, a connection end portion 146 extending to be connected to the rotary shaft 12 is formed on the circumferential face of the support cover 140, so that the panel operation device 100 may be rotated starting from one side end when the rotary shaft 12 is rotated. Since the support cover 140 is formed in the form of "r" as the connection end 146 is formed on the circumferential face, and the rotary shaft 12 is coupled to the end of the connection end 146, thereby ensuring the rotation radii of the panel operation device 100 and the rotary operation device 200, the button-type gearshift mode and the dial-type gearshift mode can be clearly distinguished from each other.

Meanwhile, a position detection magnet 260 may be provided on the rotary operation device 200 and a position sensor 160 may be provided on the panel operation device 100. The position sensor 160 may be configured to sense a positional change of the position detection magnet 260 during the rotation of the rotary operation device 200.

Here, the position detection magnet 260 should be installed at a position other than the rotation center of the rotary operation device 200, and the position sensor 160 is formed to correspond to the rotation radius of the position detection magnet 260 during the rotation of the rotary operation device 200, and is configured to sense the position of the position detection magnet 260. The position detection magnet 260 may be a permanent magnet, and the position sensor 160 may be a position detection Printed Circuit Board (PCB).

Meanwhile, the console panel 10 is provided with a drive motor 16 connected to the rotary shaft 12 and operated under the control of the controller E to rotate the rotary shaft 12, and the rotary shaft 12 may be rotated in forward and reverse directions by 90 degrees during the operation of the drive motor 16. That is, the drive motor 16 is connected to the rotary shaft 12, and during the operation of the driving motor 16, the rotary shaft 12 is rotated by receiving the rotational power transmitted from the rotary shaft 12, so that the panel operation device 100 may be rotated. Particularly, the drive motor 16 is operated under the control of the controller E, and when the drive motor 16 is operated to rotate the rotary shaft 12 by 90 degrees, the operation buttons 122 of the panel operation device 100 may be seen upward so that a button-type gearshift mode may be implemented, or the rotary operation device 200 may be seen upward so that a dial-type gearshift mode may be implemented.

Meanwhile, when the end face of the panel operation device 100 is disposed to face upward of the console panel 10, the controller E may enable the gearshift control to be performed with a gearshift signal according to the operation of the operation buttons 122, and may cause a gearshift signal according to the rotation of the rotary operation device 200 to be shut off.

That is, when the driver desires to use the button-type gearshift mode, the end face of the panel operation device 100 is disposed to face upward of the console panel 10, so that the operation buttons 122 provided on the panel operation device 100 can be easily operated. At this time, the controller E may enable the gearshift control to be performed with a gearshift signal according to the operation of the operation cover 120, and may cause a gearshift signal according to the rotation of the rotary operation device 200 to be shut off, so that the gearshift operation is enabled only with the button-type.

On the contrary, when the panel operation device 100 is rotated so that the rotary operation device 200 faces upward, the controller E may enable the gearshift control to be performed with a gearshift signal according to the rotation of the rotary operation device 200, and may cause a gearshift signal according to the operation of the operation buttons 122 to be shut off.

That is, when the driver desires to use the dial-type gearshift mode, the panel operation device 100 is rotated such that the rotary operation device 200 is disposed to face upward, and as a result, the operation of the rotary operation device 200 may be facilitated. At this time, the controller E may enable the gearshift control to be performed with a gearshift signal according to the operation of the rotary operation device 200, and may cause a gearshift signal according to the operation of the operation buttons 122 to be shut off, so that the gearshift operation is enabled only with the dial-type.

As described above, the controller E determines whether to perform the button-type gearshift mode or the dial-type gearshift mode according to the rotated position of the panel operation device 100, and permits only an operation according to the corresponding gearshift mode, thereby preventing an erroneous operation.

Meanwhile, as can be seen from FIG. 2, the panel operation device 100 or the console panel 10 is provided with manual gearshift mode buttons 180, and when a command input is input according to the operation of the manual gearshift mode buttons 180, the controller E controls the drive motor 16 such that the rotary operation device 200 is disposed to face upward, and as a result, gearshift control to a positive (+) stage or a negative (−) stage may be performed by the operation of the rotary operation device 200.

In this way, the panel operation device 100 may be provided with the manual shift mode buttons 180 together with the operation buttons 122 according to the P, R, N, and D stages, thereby implementing both of an automatic gearshift mode and a manual gearshift mode.

That is, when a command is input according to the operation of the manual shift mode buttons 180, the controller E controls the drive motor 16 to rotate the rotary shaft 12 and as the panel operation device 100 is rotated together with the rotary shaft 12, the rotary operation device 200 is disposed to face upward. At this time, the rotary operation device 200 causes a gearshift to be executed to a plus (+) or minus (−) stage according to the rotation direction thereof.

In this case, the controller E may enable an instruction according to the operation of the manual shift mode buttons 180 to be executed only when the current gearshift stage is in the D-stage, and when the manual shift mode buttons 180 are operated again in the traveling state in the manual gearshift mode, the controller E may cause the panel operation device 100 to be returned to the original position and then to be switched to the D-stage. The return operation may be performed in a manner different from the re-operation of the manual shift mode buttons 180 by performing a return operation through a separate return button.

Meanwhile, as can be seen from FIG. 1, mode switching buttons 18 may be provided on the console panel 10 or the panel operation device 100. Here, the mode switching buttons 18 are provided to enable the gearshift control of the P, R, N, and D stages in the dial-type shift mode as well as in the button-type gearshift mode.

That is, when a command according to the operation of the mode switching buttons 18 is input, the controller E controls the drive motor 16 so as to cause the panel operation device 100 to rotate. When the end face of the panel operation device 100 faces upward, the controller E causes the gearshift control to be performed by the operation of the operation button 122, and when the rotary operation device 200 is disposed to face upward, the controller E causes the gearshift control to be performed by the rotation operation of the rotary operation device 200.

When the panel operation device 100 is rotated through the mode switching buttons 18 in this way, the end face of the panel operation device 100 is disposed to face upward or the rotary operation device 200 is disposed to face upward, so that the P, R, N, and D stages may be switched in the button-type gearshift mode or in the dial-type gearshift mode.

That is, when the drive motor 16 is operated by the operation of the mode switching buttons 18 so that the end surface of the panel operation device 100 is disposed to face upward, the P, R, N, and D stages may be switched in the button-type gearshift mode in which the gearshift operation is enabled through the operation buttons 122, and when the rotary operation device 200 is disposed to face upward, the P, R, N, and D stages may be switched in a dial-type gearshift mode in which a gearshift operation is enabled through the rotary operation device 200. Therefore, since the gearshift mode desired by the driver can be provided merely by operating the mode switching buttons 18, convenience can be improved.

However, when the mode switching buttons 18 are operated in the state where the vehicle is stopped, the controller E causes the control according to the corresponding command to be performed. That is, since the button-type gearshift mode and the dial-type gearshift mode are completely different from each other in terms of operation methods thereof, an erroneous operation may occur in a gearshift situation when the gearshift mode is changed during the traveling.

Thus, by making control be performed according to a corresponding command when the mode switching buttons 18 are operated at the P-stage at which the vehicle is in the stopped state, the driver may clearly recognize that switching to a specific gearshift mode is performed, so that safe traveling can be performed in the corresponding gearshift mode.

The electronic transmission system having the above-described structure enables a button-type gearshift mode and a dial-type gearshift mode to be selectively used, so that various operational feelings may be provided to the driver. Therefore, since a gearshift operation can be performed in a mode desired by the driver, convenience can be improved.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present disclosure have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the invention be defined by the Claims appended hereto and their equivalents.

What is claimed is:

1. An electronic transmission system comprising:
 a panel operation device coupled to a rotary shaft in a console panel such that the panel operation device is rotatable by the rotary shaft, the panel operation device having a plurality of operation buttons on an end face thereof, each of which transmits a gearshift signal; and
 a rotary operation device disposed on the panel operation device, exposed from a circumferential face of the panel operation device, and rotating in a circumferential direction of the panel operation device so that the rotary operation device transmits the gearshift signal while being rotationally operated, wherein the console panel has a drive motor connected to the rotary shaft and rotating the rotary shaft by a controller, and the drive motor causes the rotary shaft to be forwardly and reversely rotated by a predetermined angle by the controller, and wherein the gearshift signal is transmitted through the plurality of operation buttons of the panel operation device or rotation of the rotary operation device, according to a setting position to which the panel operation device is rotated in the console panel by the drive motor by control of the controller.

2. The electronic transmission system of claim 1, wherein the console panel has a depression recess formed therein such that the panel operation device is seated in the depression recess, and wherein the rotary shaft extends in a horizontal direction such that the panel operation device is rotatably disposed in the depression recess.

3. The electronic transmission system of claim 1, wherein the panel operation device includes:

an operation cover having a panel shape and having an end face, the operation cover including the plurality of operation buttons on the end face of the operation cover; and a support cover which has the same panel shape as the operation cover, has a fixing pin extending in a vertical direction of an end face of the support cover, and is spaced apart from the operation cover by being coupled with the operation cover through the fixing pin.

4. The electronic transmission system of claim 3, further comprising:

a connection end portion disposed on a circumferential face of the support cover and extending to be connected to the rotary shaft.

5. The electronic transmission system of claim 3, wherein the rotary operation device is interposed between the operation cover and the support cover, and wherein the fixing pin penetrates the rotary operation device so that the rotary operation device is rotatable about the fixing pin.

6. The electronic transmission system of claim 5, wherein each of the operating cover, the support cover, and the rotary operation device has a circular shape and has a same center of circle, and wherein the fixing pin of the support cover is disposed at the center of the circle.

7. The electronic transmission system of claim 6, wherein the rotary operation device has a width that is larger than a width of the operation cover and the support cover, so that the rotary operation device is exposed in a circumferential direction between the operation cover and the support cover.

8. The electronic transmission system of claim 5, wherein the operation cover includes:

a first detent recess depressed on the end face of the operation cover that faces the rotary operation device in a width smaller than an entire width;

and a plurality of protrusions disposed along a circumferential face of the first detent recess to repeatedly protrude toward a center of the first detent recess, and wherein the rotary operation device includes a detent mechanism disposed to correspond to the circumferential face of the first detent recess and elastically moving toward the circumferential face of the first detent recess.

9. The electronic transmission system of claim 8, wherein the rotary operation device includes a mounting hole at a position corresponding to the circumferential face of the first detent recess, and wherein the detent mechanism includes:

an elastic body fixed to the mounting hole and applying a tensile elastic force; and a detent pin coupled to the elastic body and extending in a same direction as the direction in which the fixing pin penetrates, so that the detent pin is in contact with the circumferential face of the first detent recess.

10. The electronic transmission system of claim 5, wherein the support cover has a second detent recess which is depressed on the end face of the support cover that faces the rotary operation device having a width smaller than an entire width, and a plurality of protrusions, which extends along a circumferential face of the second detent recess to repeatedly protrude toward a center of the second detent recess.

11. The electronic transmission system of claim 1, wherein the rotary operation device has a position detection magnet, and wherein the panel operation device includes a position sensor that senses a change in position of the position detection magnet during the rotation of the rotary operation device.

12. The electronic transmission system of claim 1, wherein the drive motor causes the rotary shaft to be forwardly and reversely rotated by 90° by the controller.

13. The electronic transmission system of claim 1, wherein, when the end face of the panel operation device faces upward of the console panel, the controller performs gearshift control by receiving the gearshift signal from the plurality of operation buttons, and stops receiving the gearshift signal according to the rotation of the rotary operation device.

14. The electronic transmission system of claim 1, wherein, when the panel operation device rotates and the rotary operation device faces upward of the console panel, the controller performs gearshift control by receiving the gearshift signal from the rotary operation device, and stops receiving the gearshift signal according to the operation of the plurality of operation buttons.

15. The electronic transmission system of claim 1, wherein the panel operation device includes a manual gearshift mode button, and wherein the controller controls the drive motor when a command is input according to the operation of the manual gearshift mode button so that the rotary operation device faces upward, and gearshift control becomes a positive (+) stage or negative (−) stage by the operation of the rotary operation device.

16. The electronic transmission system of claim 1, wherein the console panel includes a mode switching button, wherein the controller controls the drive motor when a command is input according to operation of the mode switching button so that the panel operation device rotates, and wherein when the end face of the panel operation device faces upward, the controller performs gearshift control by the operation of the plurality of operation buttons, and when the rotary operation device faces upward, the controller performs gearshift control by rotational operation of the rotary operation device.

17. The electronic transmission system of claim 16, wherein, when the mode switching button is operated while a vehicle stops, the controller causes control according to a corresponding command.

18. The electronic transmission system of claim 1, wherein the shift signal is transmitted according to rotation of the rotary operation device.

* * * * *